United States Patent
Parks

(10) Patent No.: US 11,346,068 B2
(45) Date of Patent: *May 31, 2022

(54) EROSION CONTROL AND WATER FLOW CONTROL

(71) Applicant: Royal Canary, LLC, Fountain Valley, CA (US)

(72) Inventor: James Clifford Parks, Thermal, CA (US)

(73) Assignee: Royal Canary, LLC, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,456

(22) Filed: Jul. 10, 2020

(65) Prior Publication Data

US 2021/0164182 A1  Jun. 3, 2021

Related U.S. Application Data

(63) Continuation of application No. 16/138,562, filed on Sep. 21, 2018, now Pat. No. 10,711,420, which is a
(Continued)

(51) Int. Cl.
*E02B 3/12* (2006.01)
*E02B 3/04* (2006.01)
(Continued)

(52) U.S. Cl.
CPC ............. *E02B 3/125* (2013.01); *E02B 3/108* (2013.01); *E02D 17/20* (2013.01); *E02D 17/202* (2013.01);
(Continued)

(58) Field of Classification Search
CPC . E02B 3/125; E02B 3/108; E02D 2200/1685; E02D 2220/00; E02D 2250/00; E02D 2300/0079
See application file for complete search history.

(56) References Cited

U.S. PATENT DOCUMENTS 4,460,292 A  7/1984 Durham et al.
6,027,652 A  2/2000 Hondroulis et al.
(Continued)

FOREIGN PATENT DOCUMENTS

GB  2171131  8/1986

OTHER PUBLICATIONS

Document cited in International Search Report and Written Opinion at p. 4, "Palm Silage Inc." James Clifford Parks, Mar. 18, 2016 in 3 pages.
(Continued)

*Primary Examiner* — Benjamin F Fiorello
(74) *Attorney, Agent, or Firm* — Knobbe, Martens, Olson & Bear, LLP

(57) ABSTRACT

A bio-friendly water flow control system can include a portable structure adapted to contain organic waste material. The water flow control system can be configured for deployment outdoors to guide water flow to limit erosion. A portable structure of such a system can include a sheath that is configured to contain waste material within an interior of the sheath. The portable structure may be configured to allow a flow of water into the interior of the sheath. The portable structure may include a waste material that includes processed palm frond particles. The portable structure may be configured to absorb a weight of water at least 50% greater than a dry weight of the portable structure.

20 Claims, 13 Drawing Sheets

Related U.S. Application Data continuation of application No. PCT/US2017/024011, filed on Mar. 24, 2017.

(60) Provisional application No. 62/313,117, filed on Mar. 24, 2016.

(51) Int. Cl.
  *E02B 3/10* (2006.01)
  *E02D 17/20* (2006.01)

(52) U.S. Cl.
  CPC .. *E02D 2200/1685* (2013.01); *E02D 2220/00* (2013.01); *E02D 2250/00* (2013.01); *E02D 2300/0079* (2013.01); *Y02A 10/11* (2018.01)

(56) References Cited

U.S. PATENT DOCUMENTS

| | | | |
|---|---|---|---|
| 6,506,307 | B1 | 1/2003 | Hondroulis et al. |
| 10,711,420 | B2 | 7/2020 | Parks |
| 2003/0031511 | A1 | 2/2003 | Tyler |
| 2005/0254899 | A1 | 11/2005 | Tyler |
| 2007/0253785 | A1 | 11/2007 | Tyler |
| 2008/0164221 | A1 | 7/2008 | Brownstein |
| 2008/0304908 | A1 | 12/2008 | Ko |
| 2011/0297885 | A1 | 12/2011 | Boerrigter |
| 2012/0152473 | A1 | 6/2012 | Azer |
| 2013/0252316 | A1 | 9/2013 | Tyler |
| 2014/0234524 | A1 | 8/2014 | Parks |
| 2016/0007630 | A1 | 1/2016 | Parks |

OTHER PUBLICATIONS

International Preliminary Report on Patentability, PCT/US2017/024011, dated Sep. 25, 2018.
International Search Report and Written Opinion, PCT/US2017/024011, dated Aug. 25, 2017.
Mohideen et al., Drying of Oil Palm Frond via Swirling Fluidization Technique, Proceedings of the World Congress of Engineering 2011, vol. III, WCE 2011, Jul. 6-8, 2011, London U.K. in 6 pages.
Paterson; D,G; The Use of Palm Leaf Mats in Soil Erosion Control; 2014.

EROSION CONTROL AND WATER FLOW CONTROL

CROSS-REFERENCE TO RELATED APPLICATIONS

This application is a continuation application of U.S. application Ser. No. 16/138562, filed Sep. 21, 2018, which is a continuation application of PCT/US2017/024011, filed Mar. 24, 2017, which claims the benefit of priority under 35 U.S.C. § 119(e) to U.S. Provisional Application No. 62/313,117, filed on Mar. 24, 2016, each of which is hereby incorporated by reference herein in its entirety.

BACKGROUND

Field of the Invention

The present disclosure relates generally to the field of erosion control and water flow control.

Description of the Related Art

Various products and combinations of products are used in erosion control and/or water flow control. Many of them are subject to challenges of accessibility, transportability, and reusability. Current erosion control and/or water flow control products have various limitations and disadvantages, and a need exists for further improvement.

SUMMARY

Soil erosion and flow water containment are problems that afflict arid as well as fertile regions. One method of controlling soil erosion and containing flow water is in the use of wattles, or fiber rolls. Similarly, filled bags, such as fiber bags, can be used. These wattles and bags can be used in a wide variety of locations and situations. For example, they may be used along mountainsides, along roadways, in farms, at construction areas, or any other place where flow water may erode the soil or where flow water needs to be contained or redirected. It may be desirable to implement these wattles and bags during heavy rains, localized flooding, or in other urgent situations.

Wattles can be elongate structures that filled with various materials. Fiber bags are smaller structures filled with various materials that can be placed in smaller or tighter areas. In both wattles and fiber bags, the fill material may include fibrous material such as palm fronds, as described herein. Palm trees are found throughout the world in arid locations and palm fronds are frequently viewed as a source of waste or trash. Palm fronds are commonly burned or chopped up to be dispersed. However, rather than being discarded, such palm fronds can be used as fill material in wattles and fiber bags, helping generate a fill material that is based on recycled products. Palm fronds have been shown to be useful as fill material.

The use of palm fronds as fill material offers a variety of advantages over traditional fill materials used in wattles. Palm fronds have a low density compared to many fill materials. For example, sandbags are often used for flow water containment, but they can weigh 30 pounds or more (or 13.6 kg). Palm fronds, by contrast, are far less dense and therefore weigh much less while dry. This facilitates easier transport to and from a given site.

Because the palm fronds can be shredded, chopped, and/or ground to various particle sizes, as described more in detail herein, palm fronds can absorb flow water. This allows the fiber bags to be relatively light during transport but to become sturdy and able to block or redirect flow water or erosion when the bags become wet. Similarly, wattles filled with material including palm can be easily transported due to their light weight to the site, but they become effective sturdy structures when they come in contact with water.

Palm fronds tend to be less dense than other fill materials. When space for transportation is limited, bags or wattles filled with palm material can be compressed to allow for the transportation of more bags or more wattles than similar structures filled with traditional materials.

Another advantage of palm as a fill material is that it is reusable. Many bags or wattles filled with traditional fill materials allow for only limited use or one-time use. However, palm-based fill material can be compressed after the flow water has subsided. The compression of the wattle or bag expels the water and allows for potential reuse of the bag or wattle. This reduces the weight of the structure and allows for easier redeployment.

Palm fronds can be used to produce an organic, biodegradable fabric. The palm fabric can be used as the bag or wattle container of the palm-based fill material. This has the added benefit of allowing the complete structure of the bag or wattle to be biodegradable. Thus, the structure is biodegradable and reduces the need to reclaim the original placement of the bags or wattles. Instead, the structures can be left in place and allowed to decompose and become part of the environment.

Because of their toughness, preparing palm fronds into a desired form has presented various difficulties. Various embodiments described herein relate to methods of preparing and processing palm fronds for convenient transport, storage, and/or mixing with additional components. This can make it much more efficient and easy to produce the fill material based on palm fronds, rather than discarding the palm fronds as is frequently done.

According to various embodiments described herein, a method of making fill material or structures containing the fill material can include collecting palm fronds, shredding, chopping, or grinding the palm fronds, and combining the palm fronds with other fill material. In some embodiments, collecting palm fronds can include collecting palm fronds with a moisture content between about 1% and about 14%. In other embodiments, the moisture content can be between about 1% and about 5%, or between about 5% and about 10%, or between about 10% and about 14%, or more. In some embodiments, making the fill material or making the erosion and flow water control structures can include drying the palm fronds to a moisture content between about 1% and about 14%. In some embodiments, shredding, chopping, and/or grinding the palm fronds includes shredding the palm fronds. In some embodiments, the palm fronds can be chopped after they are shredded. In some embodiments, the palm fronds can be ground after they are chopped. In some embodiments, the other fill material includes a ballast material. In some embodiments, the other fill material includes a binding agent. The other fill material may also optionally include other materials, such as water treatment agents, purifying agents, nutritional additives, or any other material used to enhance the functionality of the erosion and flow water control structures.

According to various embodiments described herein, a method of making fill material or structures containing the fill material can include collecting palm fronds and drying the palm fronds in wind rows. The palm fronds can be shredded, chopped, and/or ground when dried to a desired moisture content. In some embodiments methods of use can comprise preparing or providing a wattle sleeve, bag, or other container, filling the container with palm based material, closing the container, transporting the container to a location of intended use, and placing the container in the use position wherein the container contacts a fluid such as flow water or another fluid. The container is preferably light for positioning and transporting, but when in contact with a fluid, the palm-filled container will absorb fluid and provide a secure barrier for erosion and/or water flow control. In some embodiments, after use, the container can be compressed to remove the fluid, making the palm based erosion and flow control retainer recyclable and reusable. In some embodiments, the entire container is biodegradable.

In some embodiments, a method of making fill material or structures containing the fill material from palm fronds can include collecting palm fronds, placing the palm fronds in rows, allowing the palm fronds to dry to a moisture content of between 1% and 25%, chopping the palm fronds, grinding the palm fronds, and combining the palm fronds with other fill material. In some embodiments, the fill material can consist essentially entirely of processed palm frond material. In some embodiments, the ratio of palm fronds to the other fill material can be between approximately 85:1 and approximately 99:1. In some embodiments, the ratio of palm fronds to the other fill material can be between approximately 85:1 and approximately 99:1. In other embodiments, the ratio of palm fronds to the other fill material can be between approximately 50:1 and approximately 95:1. In some embodiments, the combined palm fronds and other fill material can be compressed. In some embodiments, the fill material can be cube and/or pellet shaped.

DETAILED DESCRIPTION

The use of waste materials (e.g., palm fronds) as fill material for eco-friendly, portable structures (e.g., wattles, "sandbags", fiber rolls) can provide many advantages over traditional fill materials used in such portable structures. Palm fronds have a low density compared to many fill materials. For example, sandbags are often used for flow water containment, but they can weigh 30 pounds or more (or 13.6 kg). Palm fronds, by contrast, are far less dense and therefore weigh much less while dry. This facilitates easier transport to and from a given site. Moreover, palm fronds are biodegradable and are frequently seen as a waste product.

Palm fronds can be so challenging to process that many landfills will not take them as a waste product. Accordingly, the palm fronds may need to be processed (e.g., shredded, ground) before being accepted by the landfills. Described herein are novel ways of processing waste materials, such as the palm fronds, and turning them into useful products that protect the environment not only by disposing of a challenging waste product but preventing damage outdoor areas, such as erosion-prone areas.

Because the palm fronds can be shredded, chopped, and/or ground to various particle sizes, as described more in detail herein, palm fronds can absorb flow water. This allows the fiber bags to be relatively light during transport but to become sturdy and able to block or redirect flow water or erosion when the bags become wet. Similarly, wattles filled with material including palm can be easily transported due to their lightweight to the site, but they become effective sturdy structures when they come in contact with water.

Palm fronds can be tough, and general processing used for other types of fill material, such as rice straw, to prepare for use in soil erosion and water control structures may be insufficient or too expensive for palm fronds. For example, placing raw palm fronds into a tub grinder may not produce palm fronds that are sufficiently chopped to be used as fill material. Additionally, raw palm fronds are generally too wet to be thrown directly into a tub grinder or other grinding or chopping machine. A variety of processes can be used to put the palm fronds into a form suitable for fill material.

The use of any type of palm frond is contemplated. For example, Washington Robustas (Mexican Fan Palms), Washingtonia Filiferas (California Fan Palms), Phoenix Canariensis (Canary Island Date Palms), Phoenix Dactylifera (Date Palms), or any other date or oil palm can be used.

Figure 1:
FIG. 1 is a block diagram of one embodiment of a method of preparing an erosion or flow water control structure.

FIG. 1 illustrates one method that can be used to process the palm fronds and prepare an erosion or flow water control structure. Other methods can be used and variations of the described method can be used as well. In some embodiments, once palm fronds have been collected, they can be laid out in wind rows. This can allow the wind and/or ambient air to dry the palm fronds. Steps can be taken to ensure growth of mold within the palm fronds is prevented or limited. For example, the wind rows can be sized such that the palm fronds are not packed too tightly or thickly, allowing fronds in the middle to dry. Additionally or alternatively, the fronds can be periodically turned over or mixed to prevent the growth of mold and to make sure that the fronds dry evenly. Preferably the palm fronds are arranged for drying in a manner that limits the amount of heat generated by the stacked palm fronds during the drying process.

Preferably, the fronds are allowed to dry until they have a moisture content greater than or equal to approximately 1% and/or less than or equal to approximately 14% In some embodiments, a moisture content greater than or equal to approximately 10% and/or less than or equal to approximately 20% can be used. In some embodiments, a moisture content greater than or equal to approximately 5% and/or less than or equal to approximately 15% can be used. In some embodiments, a moisture content greater than or equal to approximately 10% and/or less than or equal to approximately 25% can be used. In some embodiments the moisture content can exceed 25%.

Figure 2:
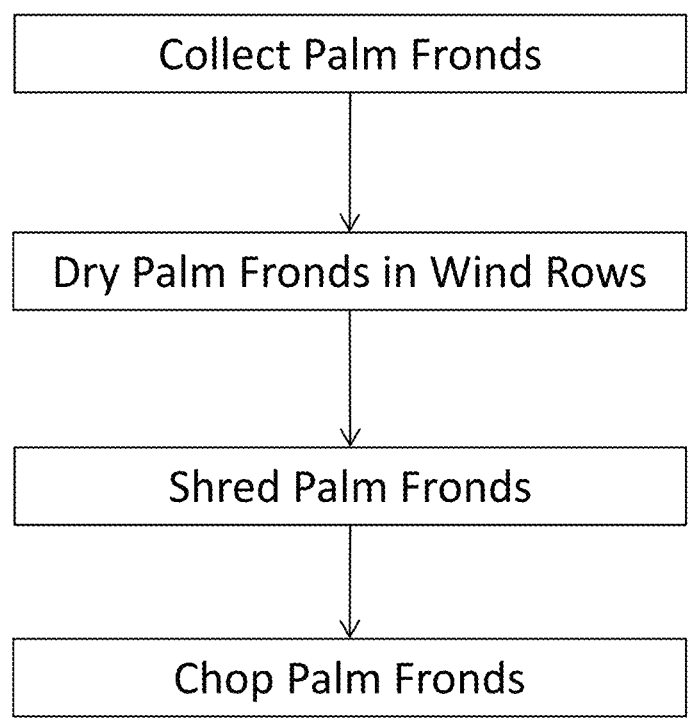
FIG. 2 is a block diagram of one embodiment of a method of processing a palm component.
Figure 3:
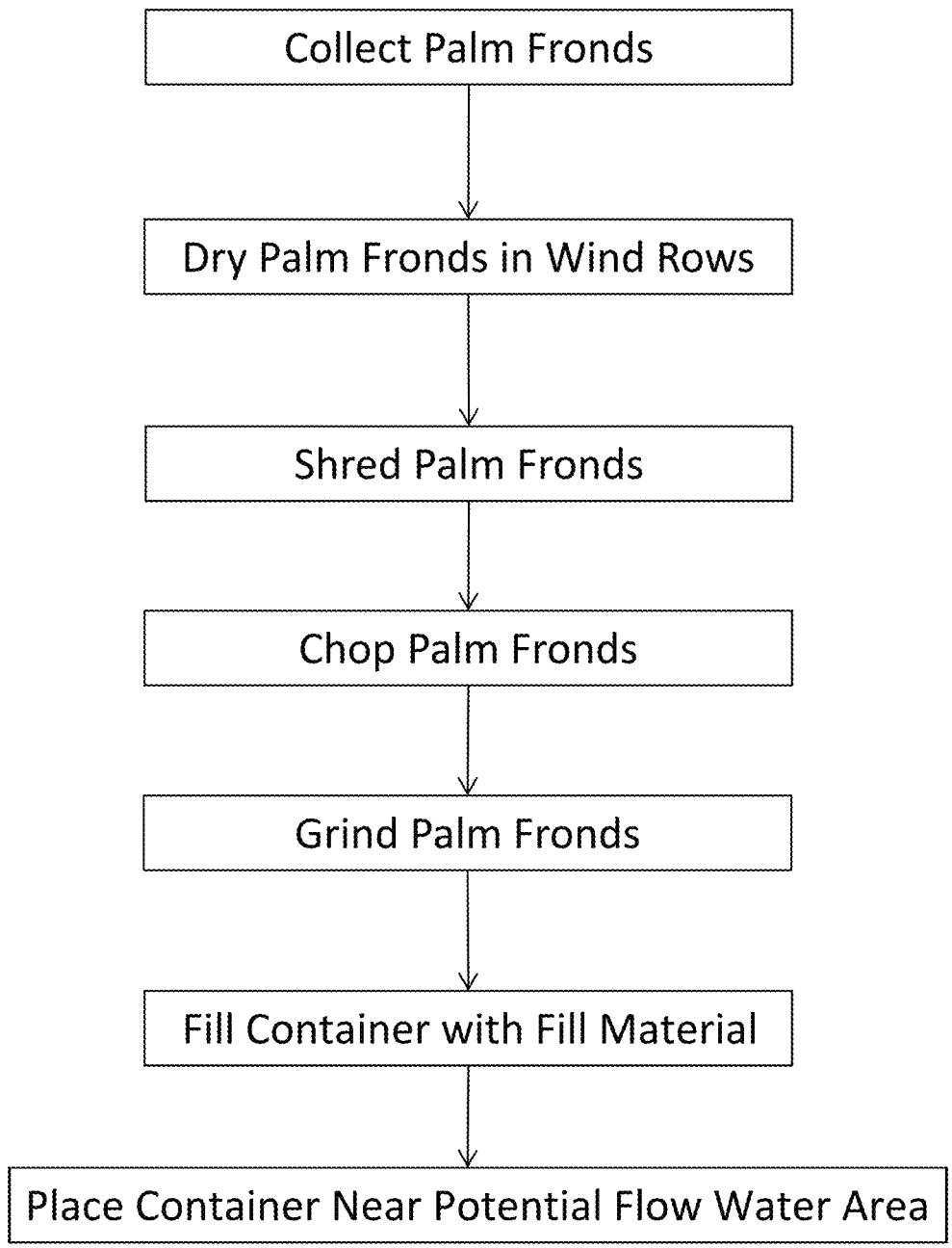
FIG. 3 is a block diagram of one embodiment of a method of controlling erosion or flow water.
Figure 4:
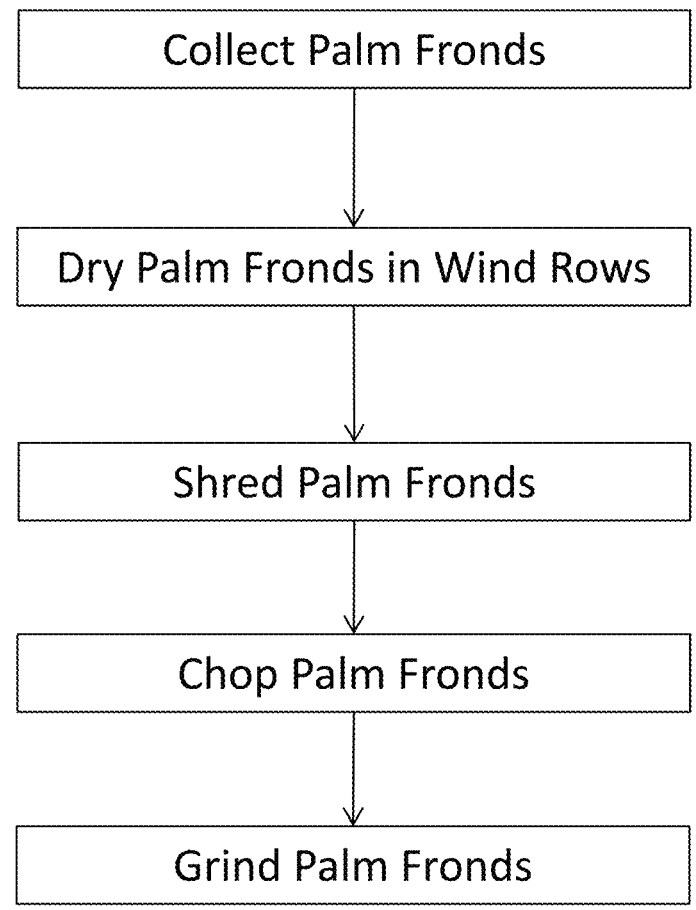
FIG. 4 is a block diagram of one embodiment of a method of processing a palm component.

Once the palm fronds have reached a desired moisture content they can be processed according to a variety of methods. In some embodiments, a shredder can be pulled over the rows to shred the palm fronds. Additionally or alternatively, the palm fronds can be fed through a shredder. As an example, a shredder sold under the brand name Balzer can be used to shred the palm fronds. Once the palm fronds have been shredded, a chopper can be used to chop the palm fronds into finer pieces. As an example, a chopper sold under the brand name Forest Harvester can be used. The chopper can also be used to harvest the dried palm fronds from the ground, passing them into a container as they are chopped. One embodiment of this method of processing palm fronds is illustrated in FIG. 2. In some embodiments, just a shredder or just a chopper can be used. In some embodiments, as illustrated in FIG. 3, the palm fronds can be ground, such as by passing through a tub grinder after being shredded and/or chopped. As an example, a tub grinder sold under the brand name Roto Grind can be used. In some embodiments, palm fronds can pass through a grinder multiple times or through multiple grinders. In some embodiments, a cone grinder can be used instead of or in addition to a tub grinder. One embodiment of a method of processing palm fronds with a grinder is illustrated in FIG. 4.

The processed palm fronds can form a base product that can be combined according to the various mixtures described above, forming a fill material. In some embodiments, various mixtures, such as mixtures described herein, can be formed within a grinder. Thus, for example, in some embodiments other materials, such as binding agent, water treatment agents, purifying agents, or nutritional additives, can be added with the palm fronds into the grinder.

Once a desired formulation has been achieved, the products can be prepared for use according to a variety of manners. In some embodiments, the fill material can be left loose as initially mixed. In some embodiments, the filler material can be baled or formed into cubes or other shapes. In some embodiments, baling or forming the material into cubes or other shapes can be done after the palm has been chopped, shredded, and/or ground. One advantage of mixing a binding agent into the palm fronds is that the binding agent can help provide a binding function, making it easier to form the fill material into cubes or any desired shape. It is understood that "cube" is a broad term and is used in its ordinary sense in this application, including, for example, to refer broadly to a compressed mixture. References to a cubed shape can refer to a generally square or rectangular shape or to having a generally square or rectangular shaped cross section, but other shapes and cross sections are possible and contemplated, such as, for example, pellets and/or generally cylindrical shapes and/or shapes with a circular or rounded cross section. Cubed material may have one or more sides or dimensions that are longer than one or more of the other sides or dimensions. In some embodiments, different cubes within a batch of cubed material may have different dimensions from other cubes within the batch. Additionally, the cubes do not necessarily have defined shapes, sides, edges or corners.

Fibers can be cut to various dimensions, depending on the circumstances. For example, in some embodiments, the length of the cut fibers can range from about 1 inch to 3 inches. In other embodiments, the fibers can be cut to about 2 to 8 inches. In certain embodiments, the fibers can be cut to about 6 to 18 inches. In some embodiments, the length of the cut fibers can range from about $\frac{1}{16}$ inch to about 2 inches. In other embodiments, the fibers can be cut to about $\frac{1}{8}$ inch to about 1 inch. In certain embodiments, the fibers can be cut to about $\frac{1}{4}$ inch to about $\frac{3}{4}$ inch. In certain embodiments, the fibers can be cut to about $\frac{1}{2}$ inch.

In some embodiments cubes or other forms of compressed fill material can be formed with a compressing machine, such as a cubing machine or a pelletizer. In some embodiments, the machine can include a grinder that can mix and/or grind the components. In such embodiments, the grinder of the compressing machine can be used in addition to or instead of a grinder during the process described with respect to FIG. 2. In some embodiments, the palm fronds added to the compressing machine can have been ground into a powder. The machine can convey the resulting material toward an area that can heat and compress the material through a die or dies that shapes the material into a cubed shape. In some embodiments a liquid, such as water, can be added to the mixture as it is compressed through a die. Different dies can produce compressed fill material of different sizes and/or shapes. After the fill material passes through the die or dies, the material can be conveyed to an area for bagging, packaging and/or shipping. In some embodiments a palm component in a shredded, chopped, or ground form can be collected and stored for use as a base or component for other fill material mixtures.

In some embodiments, a mixture can be passed through a filter, such as a screen or strainer, after it goes through a grinder, whether a first grinder and/or a grinder associated with a compressing machine. This can help remove large pieces and hard pieces that might not grind up. In some embodiments, a mixture can pass through multiple filters. For example, a grinder may include a filter, and it may be desirable to pass the ground material through a second filter before it goes into the grinder or after it comes out of the grinder.

The fill material may be optionally cubed. Cubing the fill material can present a variety of advantages. For example, cubed fill material can be generally easier and more efficient to ship and/or store. As a further example, because cubes can be compressed when formed, they can have a greater density than loose fill material allowing for more material by mass to fit within the same volume. In some embodiments, cubes can be shipped and/or stored in large containers, such as sacks, boxes, or other containers. The containers may be spherical, cubic, elongate, or irregular in shape. In some embodiments, containers can be sized to hold 1000 lbs of cubed fill material. In some embodiments they can hold more or less. In some embodiments, cubes can be stored and/or shipped loosely.

In some embodiments, a base material can be passed through a mill to collect scrap material left in the mill that can be added to the fill material. For example, in some embodiments a base material including a mixture of palm fronds can be fed through a mill that had previously been used to process or transport a first, different fill product. The scraps of the first fill product that remain within the mill. This can help minimize and/or eliminate cleaning costs that would otherwise be incurred.

Figure 5A:
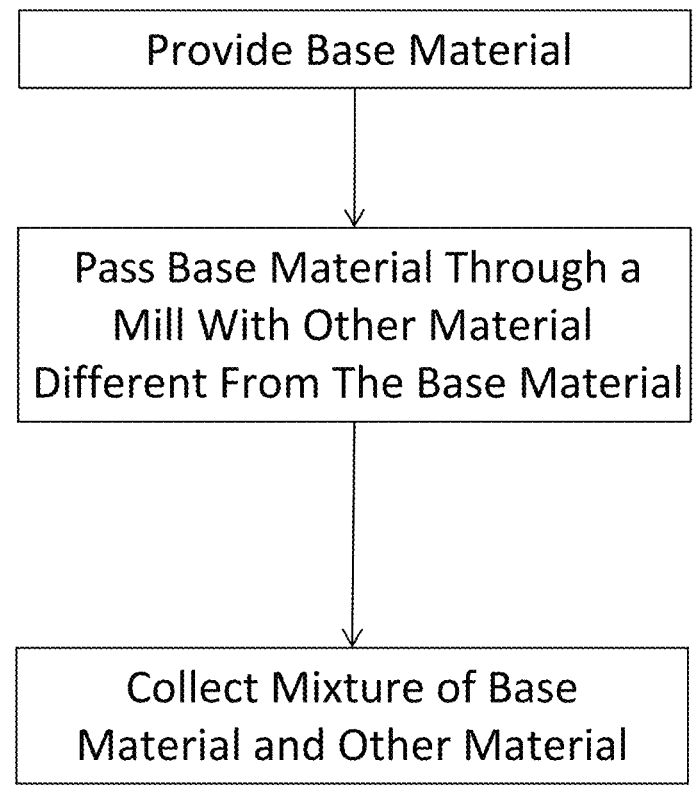
FIG. 5A is a block diagram of one embodiment of a method of cleaning a mill.

FIG. 5A illustrates one embodiment of this method. A base material can be provided and then passed through a mill. In some embodiments, the base material can include a palm frond component and another material component. The mixture, which can contain a combination of the base material and the other material from the different mixture or material, can then be collected.

Figure 5B:
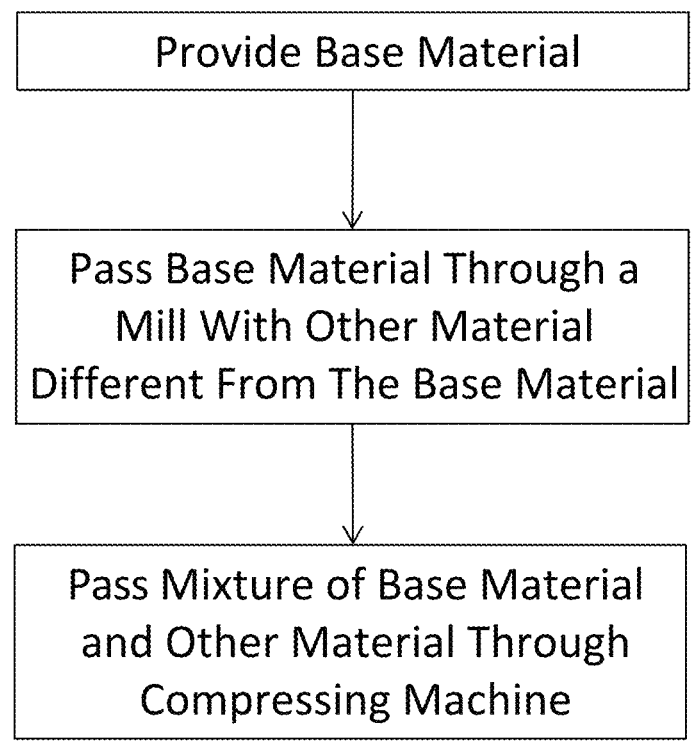
FIG. 5B is a block diagram of one embodiment of a method of preparing a compressed fill mixture such as a cubed and/or pelletized fill material mixture.

In some embodiments, as illustrated in FIG. 5B, the mixture of the base material and other material can be passed through a compressing machine, such as a cubing machine or a pelletizer. In some embodiments, the mill can be connected to the compressing machine such that the mixture of the base material and mill run can pass directly into the compressing machine from the mill. In such embodiments, the mill can also help provide a desired rate of mixed fill material into the compressing machine. In some embodiments, the mixture of the base material and other material can be collected first from the mill and then inserted into a compressing machine.

Palm Frond Fill Material Wattles and Bags

Figure 6:
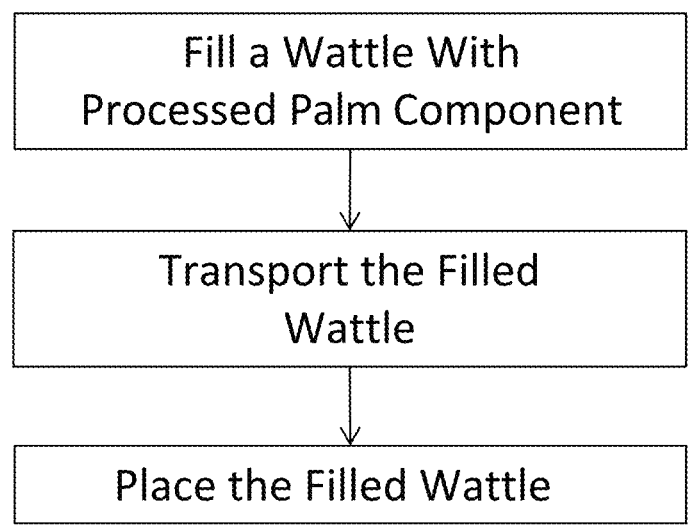
FIG. 6 is a block diagram of one embodiment of a method of erosion or flow water control using a wattle.

FIG. 6 is a block diagram of one embodiment of a method of erosion or flow water control using a wattle. It is understood that "wattle" is a broad term and is used in its ordinary sense in this application, including, for example, to refer broadly to a sleeve, bag, or tube structure filled with a material, and that can be placed in a landscape and used to limit erosion and/or control flow water. References is made to a generally tubular shape, however, other shapes and cross sections are possible and contemplated. As illustrated in FIG. 6, in some embodiments, a palm frond base can be combined with different proportions of other materials to fill a wattle. These wattles can be used to slow, stop, or control the erosion of soil or other material. In some embodiments, the wattles can be used to slow, stop, or control the movement of flow water. In either a soil erosion or flow water control structure, the control of water flow or soil erosion can include the redirection of water to a given location or away from a given location. The fill material may include other materials in addition to, or instead of, palm frond material. In some embodiments, such other fill material includes a ballast material, such as sand, soil, or gravel. In some embodiments, the other fill material includes a binding agent. The other fill material may also optionally include other materials, such as water treatment agents, purifying agents, nutritional additives, or any other material used to enhance the functionality of the erosion and flow water control structures.

The wattle, in some embodiments, can be filled with substantially 100% palm material. In some embodiments, the ratio of palm material to other material can vary greatly depending on the need. Various ranges of ratios are possible and may describe ratios of weight or volume. For example, in some embodiments, the ratio of palm material to other material can be about 600:1 to 1000:1. In other embodiments, the ratio is closer to about 70:1 to 95:1. In some embodiments, the amount of other material is higher such that the ratio is in the range of about 25:1 to 60:1. In still other embodiments, the ratio may be closer to about 1:1 to 10:1. In some embodiments, the other material can be ash and/or a rice based material.

The size and shape of the bag or wattle can vary greatly depending on the task at hand. For example, the wattles can be approximately cylindrical, cubes, rectangular prisms, or irregularly shaped. The bags can be similarly shaped. Wattles can have lengths of about six inches to up to five feet. In some embodiments, wattles can be as long as 4 to 20 feet. In still other embodiments, wattles can range from 15 to 100 feet long. Other embodiments can have wattles that are 50 to 500 feet long.

Wattles can have various other dimensions. In many embodiments, wattles can be cylindrical in shape with a diameter of about half an inch to 8 inches. In some embodiments, the wattles can range in diameter from 3 inches to 2 feet. In other embodiments, the diameter of the wattle can be about 1 foot to 5 feet in diameter. For wattles that are not cylindrical shapes, the above dimensions that describe diameter can apply to the width or depth of the wattle.

The proportion of the wattle that is filled can also vary. In some embodiments, the wattle is filled to about 10-30% capacity with the fill material. In many embodiments, the wattle is filled to about 25-85% capacity. Some embodiments of wattles comprise a wattle that is filled to about 90-100% of fill material.

The fibers that fill the wattle can be cut to various lengths, depending on the circumstances. For example, in some embodiments, the length of the cut fibers can range from about 1 inch to 3 inches. In other embodiments, the fibers can be cut to about 2 to 8 inches. In certain embodiments, the fibers can be cut to about 6 to 18 inches. In other embodiments, the fibers can be cut to about ⅛ inch to 1 inch. Other dimensions, including smaller dimensions, are also contemplated as described herein.

In some embodiments, the wattles comprise a fill material and a container. The container can be a mesh netting in some embodiments. In some embodiments, the container can be comprised of a burlap bag. In other embodiments, the container comprises a geotextile, a plastic, a nylon, and/or a biodegradable material. As described herein, the fill material can be contained in a fabric that comprises palm frond material, according to certain embodiments.

Figure 7:
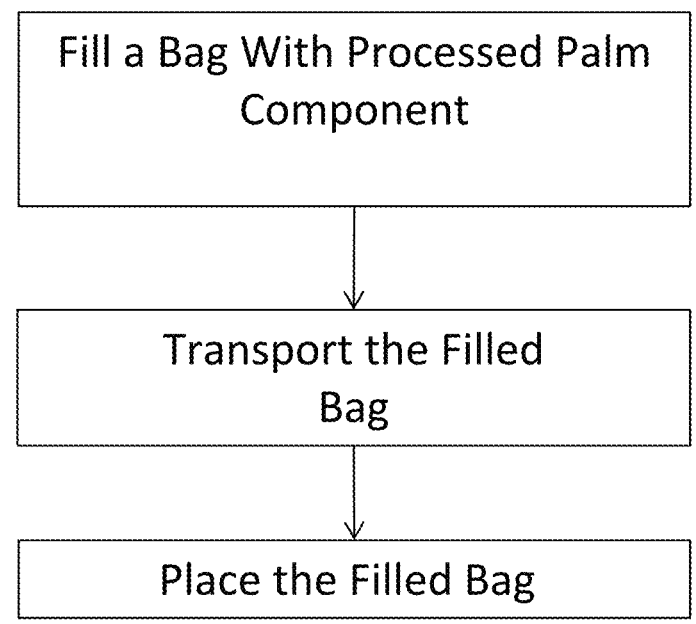
FIG. 7 is a block diagram of one embodiment of a method of erosion or flow water control using a bag.

FIG. 7 is a block diagram of one embodiment of a method of erosion or flow water control using a bag. As illustrated in FIG. 7, in some embodiments, bags filled with processed palm component can be placed at a given location. Fill materials described herein that include a combination of a palm frond component can form a base for fill material that can replace other fill materials, such as sand, gravel, or soil, that may be used in other soil erosion or flow water control bags. The particular ratios of palm material to other material can vary depending on the need. Also, as above, the various ratios described below are understood to in some embodiments describe ratios of pre-mixed volumes and in other embodiments describe ratios by weight.

The ratio of palm material to other material can vary greatly depending on the need. In some embodiments, the palm material is substantially 100% of the fill material. Various ranges of ratios are possible and may describe ratios of weight or volume. For example, in some embodiments, the ratio of palm material to other material can be about 600:1 to 1000:1. In other embodiments, the ratio is closer to about 70:1 to 95:1. In some embodiments, the amount of other material is higher such that the ratio is in the range of about 25:1 to 60:1. In still other embodiments, the ratio may be closer to about 1:1 to 10:1.

Fiber bags can be filled with palm frond fill material, as described above. The size and shape of the bags can vary greatly as well. The bags can have a length of about 3 inches to 25 inches in certain embodiments. In some embodiments, the bags can have a length of 10 inches to 40 inches. In some embodiments, the length of the bags can be about 25 inches to 100 inches. The width of the bags can have similar dimensions to the length. In some embodiments, the bags can have a height of about a half inch to 6 inches. In some embodiments, the height can be about 3 inches to 20 inches. The bags can be approximately cubic, rectangular prism, spherical, cylindrical, or irregular in shape.

The proportion of the bag that is filled can also vary. In some embodiments, the wattle is filled to about 5-30% capacity with the fill material. In many embodiments, the wattle is filled to about 25-85% capacity. Some embodiments of wattles comprise a wattle that is filled to about 75-100% of fill material.

The fibers that fill the bags can be ground to various degrees of fineness, depending on the circumstances. In certain embodiments, it may be desirable to have a finer ground fiber in the bags to enhance absorption of flow water. For example, in some embodiments, the fibers can be ground to particles in the range of about 1/124 inch to 1/16 inch. In other embodiments, the fibers can be ground to about 1/32 inch to 1/2 inch. In certain embodiments, the fibers can be ground to about 1/4 inch to 1 inch. Still other embodiments allow the fibers to be ground to about 1/2 inch to 3 inches. Other dimensions are also contemplated as described herein.

In many embodiments, the bags comprise a fill material and a container. The container can be a mesh netting in some embodiments. In some embodiments, the container can be comprised of a burlap bag. In other embodiments, the container comprises a geotextile, a plastic, a nylon, and/or a biodegradable material. In certain embodiments, it may be desirable that the bag be porous to allow water to come into contact with the fill material. As described herein, the fill material can be contained in a fabric that comprises palm frond material, according to certain embodiments.

Palm fronds can be used to produce an organic, biodegradable fabric. The palm fabric can be used as the bag or wattle container of the palm-based fill material. In certain embodiments, the palm fabric is sewn, thatched, and/or laced. In some embodiments, the fabric comprises a binding material to keep the fibers held together or contained within the bag and increase structural integrity of the bag.

Figure 8A:
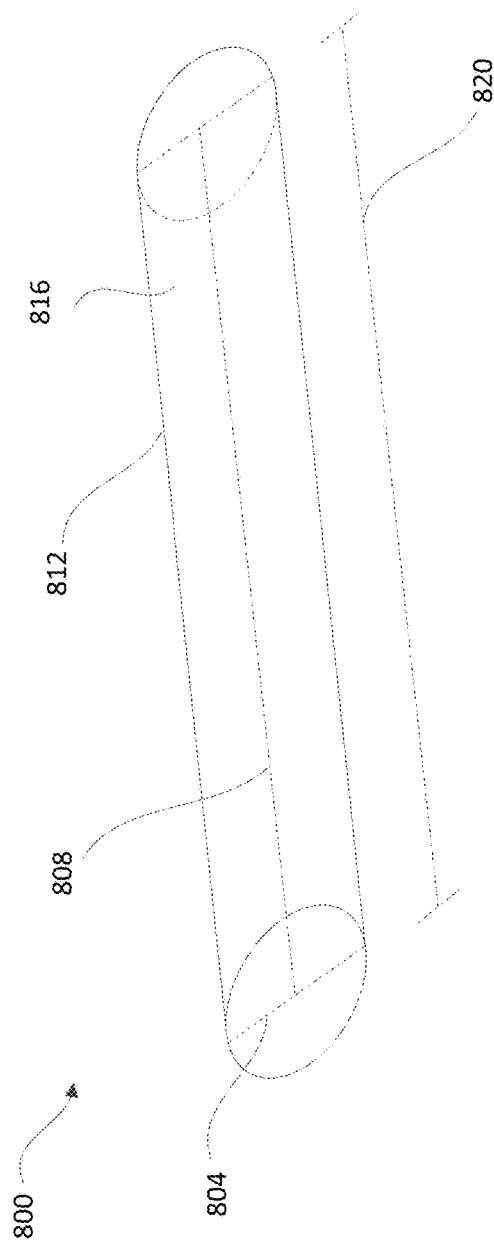
FIG. 8A shows an example portable structure in elongate fill configuration.

FIG. 8A shows an example portable structure 800 in elongate fill configuration. The portable structure 800 may have a major axis 808 and a length 820 along the major axis 808. The diameter 804 of the portable structure 800 is also shown. A surface 812 of the portable structure 800 may be used to direct the flow of water, for example, to prevent erosion, absorb water, and/or serve as a barrier to incoming water. The surface a 12 of the portable structure 800 may include a sheath 816. The sheath 816 may have a mesh structure. The sheath 816 may include a flexible material, such as, for example, a burlap sack, a mesh material, a nylon material, a metal wiring, and organic container, twine, and/or other container. While a major axis 808 may be depicted as a straight line, in some embodiments the portable structure 800 is flexible and able to snake along various paths. Thus, the major axis 808 may be defined along a curve coinciding with a center of a cylindrical shape of the portable structure 800. The portable structure 800 in elongate fill configuration may be a wattle and/or a fiber roll. In some embodiments, the wattle may be a cylinder, a rectangular prism, or other similar shape.

The portable structure can have various diameters and other dimensions. In some embodiments, the diameter may be referred to as a width. In some embodiments, the diameter of the portable structure is between about 3 inches and 21 inches. In some embodiments, the diameter is between about 6 inches and 15 inches. The portable structure may be up to 50 feet long, or more. In some embodiments, the structure is between about 15 feet and 40 feet long. In some preferred embodiments, the structures are between about 25 feet and 30 feet long. In some embodiments, the structures are less than 15 feet long. The structure 800 may have a weight of less than about 120 pounds. In some embodiments, the weight is between about 55 pounds and 110 pounds. In some preferred embodiments, the weight is about 90 pounds.

The portable structure 800 may be filled with a first waste material, such as processed palm frond particles. Other waste materials are possible. The processed palm frond particles may have a length and/or diameter of less than about 3 inches. In some embodiments, the length and/or diameter of the palm frond particles is less than about 2 inches. Smaller palm frond particles may absorb a higher proportion of water. Some embodiments include palm from particles with the diameter of less than half an inch.

The processed palm from particles may be configured to absorb the weight of water of the least 50% greater than a dry weight of the portable structure 800. In some embodiments, the palm frond particles are configured to absorb a weight of at least 100% of the dry weight of the portable structure 800. Depending on the size of the palm frond particles, some embodiments may be able to absorb a weight of water greater than 100% of the dry weight of the portable structure 800.

The weight of the portable structure 800 may vary based on the length and/or diameter of the structure. How wet the structure 800 is can also play a significant role. For example, the portable structure 800 may have a dry weight of less than about 16 pounds. In some embodiments, the dry weight of the portable structure 800 is between about 2 pounds and 9 pounds. The structure 800 may have a wet weight of up to five times the dry weight. The maximum wet weight of the structure 800 may depend on the type of waste material and/or size of the particles contained within the structure 800. The portable structure 800 may be configured to absorb weight of water at least 50% greater than the dry weight structure 800. In some preferred embodiments, the portable structure is configured to absorb a weight of water of at least 100% greater than the dry weight, thus doubling the dry weight of the structure. Structures containing palm particles with a length of less than 2 inches, for example, may be configured to absorb enough water to more than double the weight of the dry weight of the structure 800.

Figure 8B:
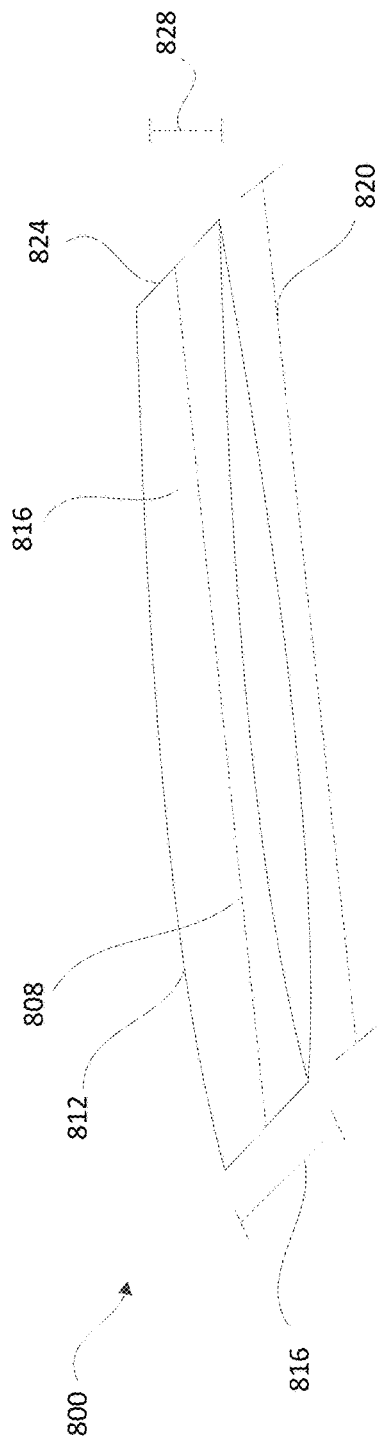
FIG. 8B illustrates a portable structure in elongate fill configuration that includes a seam on one or both ends of the portable structure.

FIG. 8B illustrates another portable structure 800 in elongate fill configuration that includes a seam 824 on one or both ends of the portable structure 800. The structure 800 may have a height 828 and a width 816. The height 828 and width 816 may be measured along axes that are orthogonal to the major axis 808.

Figure 8C:
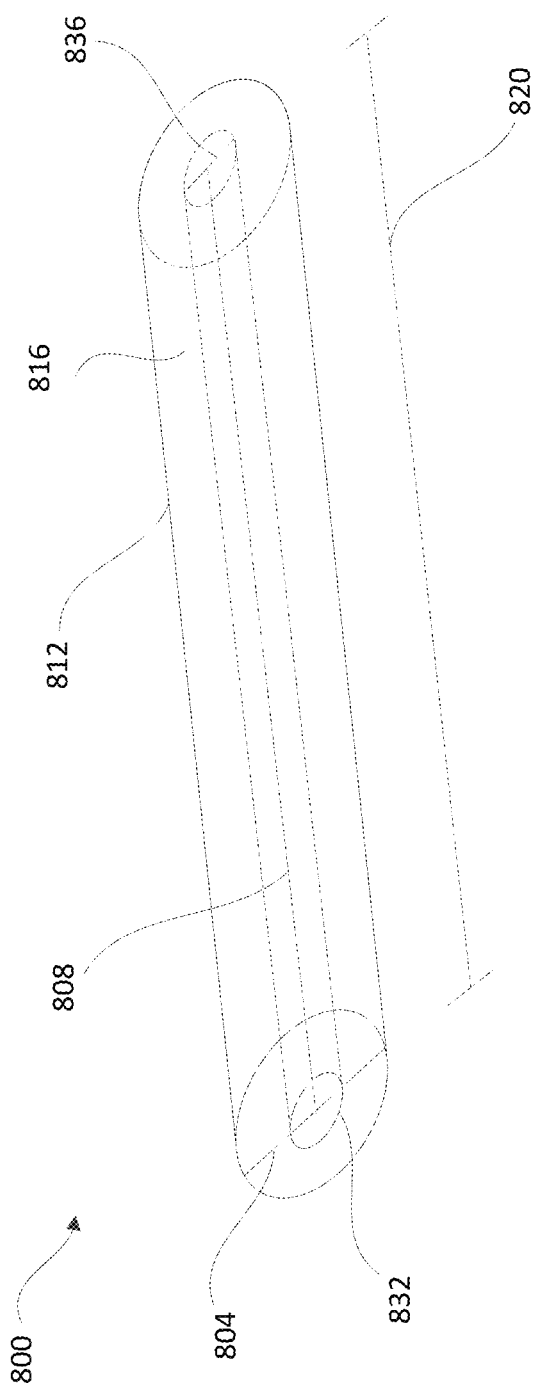
FIG. 8C illustrates a portable structure with an absorptive core.

FIG. 8C illustrates a portable structure 800 with an absorptive core 832. Absorptive core 832 may include a jacket, such as a burlap sack, a mesh material, a nylon material, a metal wiring, and organic container, twine, and/or other container. The jacket may be at least partially comprised of waste product, such as palm fronds. The absorptive core 832 may have an axis that is coaxial with the major axis 808 of the portable structure 800. The absorptive core 832 may have a diameter 836. The diameter 836 may be between about a half inch and 7 inches. In some embodiments, the diameter 836 is between about 2 inches and 5 inches.

The jacket may contain a second waste material in its interior. The second waste material may comprise palm frond particles, such as any of those described elsewhere herein. Other waste materials may also be used. Palm frond particles of the second waste material may have a smaller diameter than palm frond particles in the first waste material. For example, the diameter of the palm frond particles of the second waste material may be between about a quarter inch and 1 inch. Other sizes are also possible.

Figure 9:
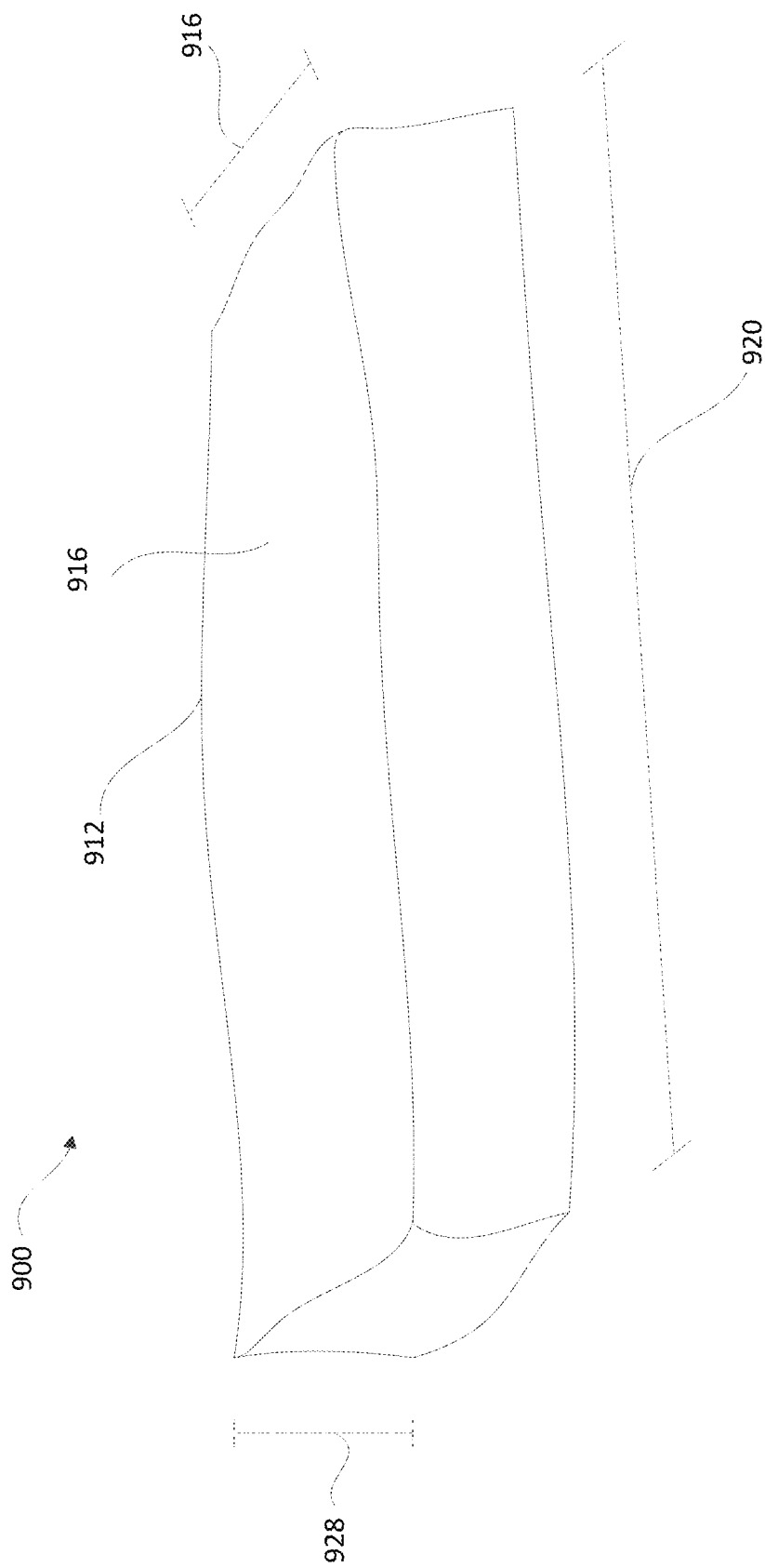
FIG. 9 illustrates a portable structure in a planar fill configuration.

FIG. 9 illustrates a portable structure 900 in a planar fill configuration. The planar fill configuration may include a palm bag (e.g., similar to a traditional sandbag), a bag of other waste material, and or other flattened structure. The portable structure 900 may have a height 928, a length 920, and a width 916. The length 920 of the portable structure may be between about 7 inches and 50 inches. For smaller embodiments, the length 920 may be between about 7 inches and 16 inches. For larger embodiments, the length 920 may be between about 30 inches and 50 inches. The width 916 of the portable structure may be between about 5 inches and 40 inches. For smaller embodiments, the width 916 may be between about 5 inches and 12 inches. For larger embodiments, the width 916 may be between about 25 inches and 45 inches. The height 928 of the portable structure may be between about 2 inches and 12 inches. For smaller embodiments, the height 928 may be between about 2 inches and 5 inches. For larger embodiments, the height 928 may be between about 6 inches and 12 inches. Other dimensions are also possible.

The portable structure 900 may have a footprint (e.g., area) of between about 40 square inches and 3200 square inches. For smaller embodiments, the footprint may be between about 40 square inches and 200 square inches. For larger embodiments, the footprint may be between about 500 square inches and 3200 square inches. The footprint may be defined as the total length 920 multiplied by the total width 916.

The weight of the portable structure 900 may vary based on the size of the structure and how wet the structure is. For example, the portable structure 900 may have a dry weight of less than about 16 pounds. In some embodiments, the dry weight of the portable structure 900 is between about 2 pounds and 9 pounds. The structure 900 may have a wet weight of up to five times the dry weight. The maximum wet weight of the structure 900 may depend on the type of waste material and/or size of the particles contained within the structure 900. The portable structure 900 may be configured to absorb weight of water at least 50% greater than the dry weight structure 900. In some preferred embodiments, the portable structure is configured to absorb a weight of water of at least 100% greater than the dry weight, thus doubling the dry weight of the structure.

Figure 10:
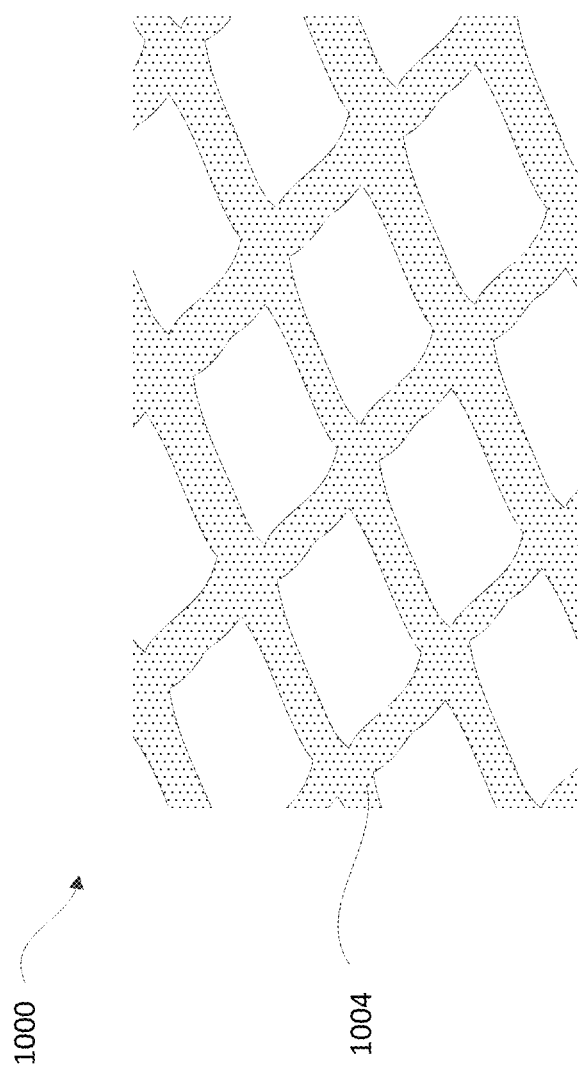
FIG. 10 illustrates an example mesh structure that may be used as part of the sheath and/or the jacket.

FIG. 10 illustrates an example mesh structure 1000 that may be used as part of the sheath 816 and/or the jacket (in certain configurations). The mesh structure 1000 comprised of a mesh material 1004. The structure 1000 may include tiny pores and/or larger openings to allow for the flow of water therethrough. In this way, water may be allowed to come in contact with the interior of the sheath 816 and/or the jacket. This can allow the weight of the portable structure to increase and/or allow the shape of the structure to deform to create a better damming effect. The deformation of the structures may also permit better fluid communication between adjacent structures, thus improving their ability to direct water flow and/or prevent erosion.

As water comes in contact with the interior of the sheath 816 and/or the jacket, the water may interact with waste material inside. The waste material (e.g., palm frond particles) may be configured to absorb a particular proportion of water relative to the weight of the waste material. For example, the waste material may be configured to absorb an additional weight from water of between about 35% and 500% relative to a dry weight of the waste material. In some preferred embodiments, the waste material is configured to absorb between about 50% and 400% additional weight from water relative to the dry weight. Smaller particles may allow for higher amounts of water absorption. Additionally, the waste material may be more densely packed to allow for greater water absorption. Accordingly, the size of the pores of the mesh structure 1000 may be appropriately sized to allow both for passage of water therethrough and for containment of the waste material particles.

The shape of the particles may include a length that is at least three times the width of the particles. In some embodiments, the length of the particles is sized to prevent leakage out of the mesh structure 1000. Such particles may be referred to as strands, hay, strings, lines, rope, yarn, thread, and/or fibers. Such terms may refer to the shape of the waste material (e.g., palm frond particles). Various dimensions and shapes of the particles are possible, such as those described above.

Waste Material Processing

Figure 11:
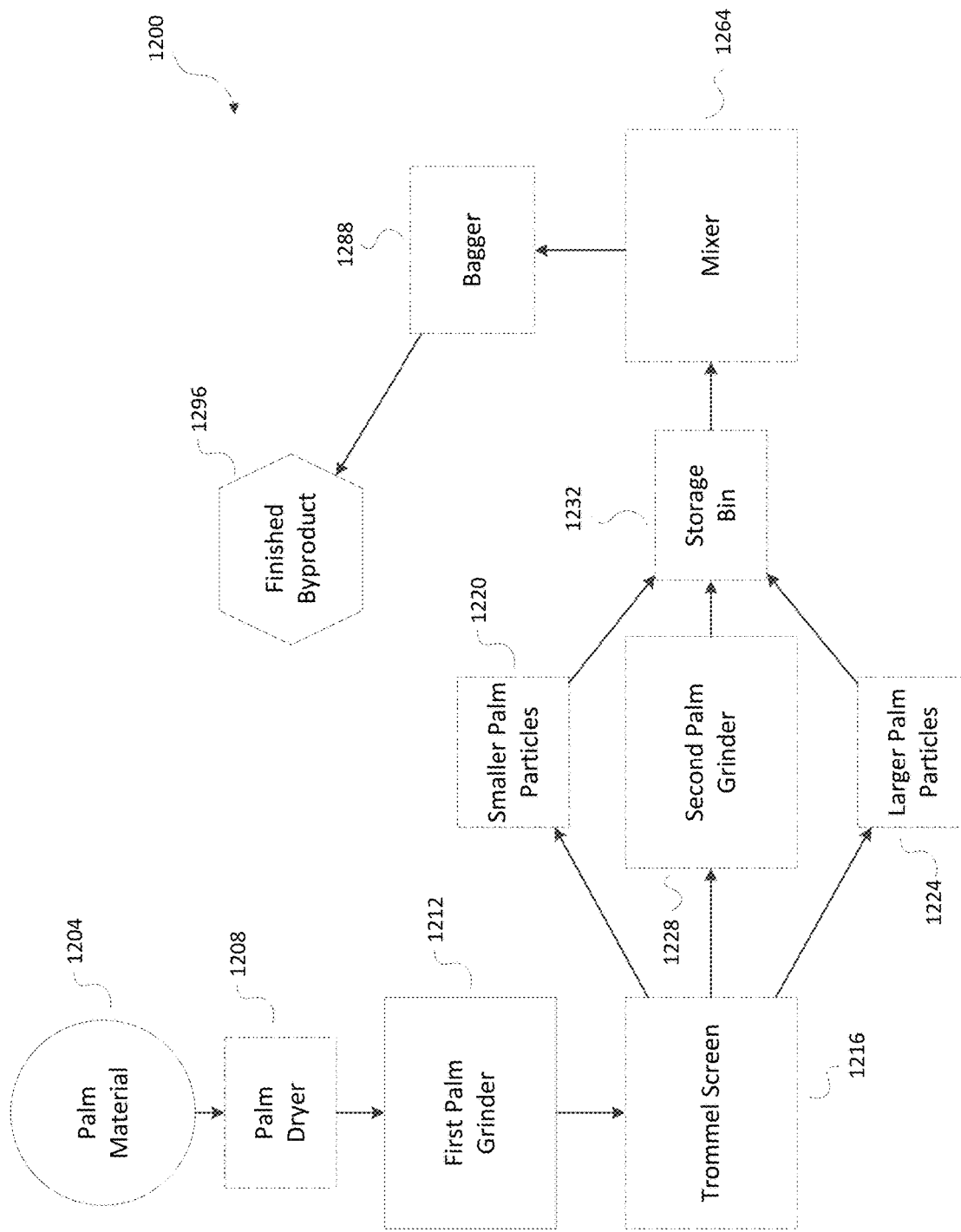
FIG. 11 illustrates an example embodiment palm waste disposal system.

FIG. 11 illustrates an example embodiment of a palm waste processing system 1200. Though the use of palm, additives, binders, and byproducts are illustrated and/or described, other waste products and materials may be used instead and/or in addition. Embodiments illustrated by FIG. 11 may include preferred elements (in solid lines) and may include optional elements (in dotted lines). The system 1200 begins with the collection of initial waste ingredients, such as palm material 1204. Optionally, the palm material 1204 may be dried and/or allowed to dry at the palm dryer 1208. In some embodiments, a tumble dryer is used to dry the palm fronds to a first maximum moisture content. In some embodiments the first maximum moisture content is between about 3% and 23% by weight. In some embodiments the first maximum moisture content is between about 7% and 20% by weight. Preferably, the first maximum moisture content is between about 10% and 17% by weight, more preferably around 14%. In some embodiments the first maximum moisture content is between about 1% and 15% by weight. In some embodiments the first maximum moisture content is between about 5% and 10% by weight. A moisture content below the first maximum moisture content can prevent blockages of flow of palm through the system 1204 and/or prevent malfunction of the machinery in the system 1204. The palm dryer 1208 may use other methods of drying, as described herein.

The palm material 1204 is sent to a first palm grinder 1212. The palm may be allowed and/or forced to pass through one or more first screens having holes with a first diameter. Thus, the resulting first palm particles may have a first maximum length and/or diameter determined by the diameter of the holes in the first screens. The first maximum length and/or diameter of the first palm particles may be between 0.8 inches and 4.5 inches. In some embodiments, the first maximum length and/or diameter of the first palm particles is between 1.4 inches and 2.7 inches. In some embodiments, the first maximum length and/or diameter is about 2 inches. In some embodiments the first palm grinder is manufactured by Vermeer. The first screen may be outfitted with a baffle to help ensure that palm frond particles with a length and/or diameter greater than the first maximum length and/or diameter do not pass through the first screen. Such a screen with a baffle is described in more detail below.

The resulting first palm particles may be sorted by a trommel screen 1216. The trommel screen may include a rotor to move particles from one end of the trommel screen to another. As the particles move to the end of the trommel screen 1216, some of the smaller palm grinding's may be filtered out. The trommel screen 1216 may comprise a screen having openings with a maximum size smaller than the diameter of the holes in the first screens. This will permit relatively larger palm particles to pass through to a second grinding while the smaller palm particles can bypass the second grinding. This improves efficiency of the system 1200 because only the particles that need to be ground a second time will go through the second grinding, thus freeing up space, power, and other resources for use in the system 1200. In some embodiments, the maximum size of the openings in the trommel screen 1216 may be comparable to the size of the holes in the second palm grinder 1228. For example, the openings may be between 0.1 inches and about 0.9 inches in diameter. In certain embodiments, some of the resulting palm particles may filtered out early, such as larger palm particles 1224 that may have a particular shape useful for erosion systems. The palm hay may undergo further processing and/or treatment in the system 1200. Alternatively, it may undergo different processing not shown here.

The trommel screen 1216 may be physically situated between the first palm grinder and the second palm grinder so that the first grinder 1212, first sorting 1216, and second grinding 1228 may automatically and smoothly move palm particles from one system element to the next without significant human intervention. For example, pneumatic systems, conveyor belts, rotors, and/or hoppers may be included to facilitate the movement of the palm particles.

The relatively larger palm particles that do not exit the trommel screen 1216 as smaller palm grindings 1220 may be referred to as the first sorted palm particles. The first sorted palm particles may enter a second grinder 1228. A second grinder different 1228 from the first palm grinder 1212 may be used. Alternatively, the second palm grinder 1228 may comprise the first palm grinder 1212 where the first screens have been switched out with different screens. The second screens (e.g., the screens of the second palm grinder), regardless if they are on the first grinder or on a separate second grinder, have holes having a second diameter. The holes in the second screen will help ensure that only palm frond particles having a second maximum length and/or diameter pass through the second palm grinder 1228. The second screens may be outfitted with baffles, as with the first screens, to help ensure that no particles having a length and/or diameter greater than the second maximum diameter pass through the second grinder. The diameter of the holes in the second screens may be between about $\frac{1}{16}$ inch and about $\frac{15}{16}$ inch and is preferably between about $\frac{1}{4}$ inch and about $\frac{3}{4}$ inch. In some embodiments, the diameter is about $\frac{1}{2}$ inch. Holes of $\frac{1}{2}$ inch can help prevent clogging and/or backlog problems in the disposal system 1200 while allowing proper mixing of the palm with other additives, as more fully described below.

The resulting second palm particles may optionally gather in a storage bin 1232. The storage bin may comprise a hopper. The storage bin is a broad term and has an ordinary meaning and may include simply an area on the floor. The storage bin 1232 also includes any particles 1220 that bypassed the second palm grinder 1232. In some embodiments, the palm particles are sent into a mixer 1264. The mixer 1264 may also receive waste material of other sizes and/or other waste material ingredients, such as a grain, a binding agent, palm byproducts including dates and/or pits, and/or any other additive as described herein.

The mixer 1264 mixes the palm material 1204 of (e.g., resulting second palm particles) and palm material of other shapes/sizes and, optionally, other waste ingredients (e.g., grain, binding agent, byproducts). The mixture may contain between about 7% and 88% palm by weight. In some embodiments, the mixture contains between about 18% and 70% palm by weight. In some embodiments, the mixture contains between about 25% and 45% palm by weight. In some embodiments, the mixture contains between about 36% and 92% palm by weight. The amount of palm may be determined by the amount of water absorption of the portable structure desired, the amount of palm available, and/or other factors.

One or more binding agents may be added to the mixture. Binding agents may include dates or other fruits, canola oil, peanut oil, corn syrup, soybean oil, palm oil, coconut oil, sunflower oil, water, egg, alcohol, gelatin, agar, flax meal, butter, tapioca, vegetable puree, honey, agave, xanthan gum, and/or any other edible binder. For example, in some embodiments the binding agent comprises canola oil and is included at about 22% by weight of the total mixture. The mixture may contain between about between about 15% and 92% binding agent by weight. In some embodiments, the mixture contains between about 19% and 78% binding agent by weight. In some embodiments, the mixture contains between about 25% and 65% binding agent by weight. In some embodiments, the mixture contains between about 20% and 35% binding agent by weight. A binding agent may not only help keep the ingredients together, but it can provide attributes that may absorb and/or repel water. The binding agent may add a preservative to the waste material to help maintain the portable structures for a longer time in the outdoors. The amount of binding agent included in the mixture may depend in part on the proportion of palm included in the mixture and/or proportion of other waste ingredients.

A grain may be included in the mixture as well. The grain may be included to provide water absorption, decrease the weight of the portable structure, increase the biodegradability of the structure, and/or provide additional support for the other waste particles in the portable structure. A common grain is wheat straw, but other grains like rice and corn are also used in many embodiments. For example, in some embodiments, the mixture includes about 5% wheat straw by weight. Other grains include buckwheat, milo, alfalfa, soy, hay, oats, barley, rye, millet, sorghum, quinoa, and/or grass. The mixture may contain between about between about 1% and 24% grains by weight. In some embodiments, the mixture contains between about 3% and 16% grains by weight. In some embodiments, the mixture contains between about 8% and 20% grains by weight. In some embodiments, the mixture contains between about 10% and 85% grains by weight.

Other additives (not shown) may be added to the mixture as well. For example, preservatives and/or sealants can be added. These may promote the durability to the waste material and/or the portable structure, support biodegradability of the structure, and/or increase the water absorption/repellent effects of the structure and/or sheath.

The waste mixture may optionally be sent to a bagger 1288. The bagger 1288 may fill one or more bags (e.g., sheathes, sacks, jackets, pouches, sleeves, etc.) with the pellets. The filled bags may be separated and stacked (e.g., on a pallet). The finished byproduct 1296 can be used as erosion protection, fill material, and/or water diversion/absorption (e.g., "sandbagging"). The finished bagged products may be one or more of any of the portable structures described above (e.g., wattles, "sandbags"). The bagged products may be loaded and/or transported to an outdoor destination and/or providing the bagged product for delivery by another.

In some embodiments, processed palm frond particles may optionally be sent directly to a bagger 1288 rather than to a mixer. The bagger 1288 may fill one or more bags (e.g., sheathes, sacks, jackets, pouches, sleeves, etc.) with the processed palm frond particles. The filled bags may be separated and stacked (e.g., on a pallet). The finished byproduct 1296 can be used as erosion protection, fill material, and/or water diversion/absorption (e.g., "sandbagging"). The finished bagged products may be one or more of any of the portable structures described above (e.g., wattles, "sandbags"). The bagged products may be loaded and/or transported to an outdoor destination and/or providing the bagged product for delivery by another.

Once at a target location (e.g., in a flooded area, in heavy rains, a long portions of a field), the portable structures may be unloaded and deployed. In some embodiments, the portable structures are loaded, transported, and/or deployed in a dry weight. However, it may be advantageous to wet the portable structures before being loaded, transported, and/or deployed to their target location(s). For example, wet portable structures may be more effective at creating a damming effect against a flow of water. Moreover, wet portable structures may be less easily dislocated from their target location(s). Wetting the portable structures may promote biodegradability and/or water retention/repulsion.

Example Embodiments

Various embodiments are provided here as examples. In a 1st embodiment, a bio-friendly water flow control system includes a portable structure adapted to contain organic waste material. The structure is configured for deployment outdoors to guide water flow to limit erosion. The portable structure includes a sheath that is configured to contain waste material within an interior of the sheath and to allow a flow of water into the interior of the sheath. The portable structure further includes a first waste material that includes processed palm frond particles. Each of the processed palm frond particles has a length of less than three inches, wherein the processed palm frond particles are disposed in the interior of the sheath and are configured to absorb a weight of water at least 50% greater than a dry weight of the portable structure. The portable structure has an outer surface and a major axis in an elongate fill configuration. The outer surface is disposed circumferentially around the major axis of the portable structure. The portable structure is configured to direct a course of water flow along the outer surface of the portable structure.

In a 2nd embodiment, the system of embodiment 1, wherein in the elongate fill configuration the portable structure has a length along the major axis of between about 25 feet and 30 feet.

In a 3rd embodiment, the system of any of embodiments 1-2, wherein in the elongate fill configuration the portable structure has a diameter of between about six inches and fifteen inches orthogonal to the major axis.

In a 4th embodiment, the system of any of embodiments 1-3, wherein the dry weight of the portable structure is a weight of the portable structure where the first waste material has a moisture content of less than 15% by weight.

In a 5th embodiment, the system of any of embodiments 1-4, wherein the dry weight of the portable structure is less than about 120 pounds.

In a 6th embodiment, the system of any of embodiments 1-5, wherein in a planar fill configuration the portable structure has a footprint of between about 40 square inches and 3200 square inches.

In a 7th embodiment, the system of any of embodiments 1-6, wherein in a planar fill configuration the portable structure has a height of between about 3 inches and 12 inches.

In a 8th embodiment, the system of any of embodiments 1-7, wherein in a planar fill configuration the portable structure has a dry weight of between about one and nine pounds.

In a 9th embodiment, the system of any of embodiments 1-8, wherein the sheath comprises a biodegradable material.

In a 10th embodiment, the system of any of embodiments 1-9, wherein the sheath comprises a mesh structure.

In a 11th embodiment, the system of any of embodiments 1-10, further comprising a second waste material comprising processed palm frond particles having a diameter of less than 1 inch, wherein the second waste material is disposed in the interior of the sheath and configured to absorb a weight of water at least 100% greater than a dry weight of the second waste material, wherein the dry weight of second waste material is a weight where the second waste material has a moisture content of less than 15% by weight.

In a 12th embodiment, the system of 11, further comprising an absorptive core comprising a jacket configured to allow the flow of water therethrough, the jacket comprising a jacket interior. The absorptive core further comprises the second waste material disposed in the interior of the jacket, wherein the absorptive core is generally coaxial with the major axis of the portable structure.

In a 13th embodiment, the system of any of embodiments 1-12, wherein the first waste material is shaped to pass through a grinding screen having holes with a diameter of about two inches.

In a 14th embodiment, the system of any of embodiments 1-13, wherein the first waste material is shaped to pass through a grinding screen having holes with a diameter of about a half inch.

In a 15th embodiment, the system of any of embodiments 1-14, wherein the sheath comprises a mesh structure.

In a 16th embodiment, a method of guiding an otherwise natural flow of water in part using organic waste material comprising arranging for waste material comprising palm fronds to dry until the palm fronds reach a moisture content below a first moisture threshold; using a grinder, grinding the waste material into processed palm frond particles having a diameter of less than two inches; forming a portable structure by filling an interior of a sheath with the ground waste material to a density of waste material configured to allow a minimum absorption of water by the ground waste material, the minimum absorption of water characterized as a weight of water greater than 50% of a dry weight of the ground waste material; and providing the portable structure for delivery to a location for use in guiding water flow.

In a 17th embodiment, the method of embodiment 16, further comprising the step of grinding at least a portion of the waste material into processed palm frond particles having a diameter of less than a half inch.

In a 18th embodiment, the method of any of embodiments 16-17, wherein the step of forming a portable structure comprises filling the interior of the sheath in an elongate fill configuration, wherein the portable structure defines a major axis of the portable structure, wherein a length of the portable structure along the major axis is at least five times a diameter of the portable structure perpendicular to the major axis.

In a 19th embodiment, the method of any of embodiments 16-17, wherein the step of forming a portable structure comprises filling the interior of the sheath in a planar fill configuration, wherein the portable structure has a length of between about 7 inches and 50 inches and a width of between about 5 inches and 40 inches.

In a 20th embodiment, the method of any of embodiments 16-17, wherein the portable structure is configured to absorb a weight in water of at least 100% greater than a dry weight of the portable structure.

In a 21st embodiment, a method of controlling water flow comprising collecting palm fronds, drying the palm fronds, grinding the palm fronds into a processed palm fill, and filling a wattle with the processed palm fill and an additional fill component. The additional fill component comprises no more than 5 percent of the total weight of the fill material. The method further comprises transporting the wattle to a potential flow water area and placing the wattle near the potential flow water area.

In a 22nd embodiment, a method of producing water flow control structures comprising collecting palm fronds, drying the palm fronds, grinding the palm fronds into a processed palm fill, and filling a wattle with the processed palm fill and an additional fill component, wherein the additional fill component comprises no more than 5 percent of the total weight of the fill material.

In a 23rd embodiment, the method of any of embodiments 21-22, wherein the processed palm frond component has a moisture content between 10 and 14 percent.

In a 24th embodiment, the method of any of embodiments 21-23, wherein the fill material is in a cubed shape.

In a 25th embodiment, the method of embodiment 24, wherein the cubed shape is a pellet shape.

In a 26th embodiment, the method of embodiment 21, wherein the additional fill component comprises a ballast material, a binding agent, a water treatment agent, a purifying agent, or a nutritional additive.

In a 27th embodiment, a method of cleaning a mill with a fill material comprising providing a first material comprising a palm frond component, passing the first material through an inlet to a mill that contains a second material different from the first material, and collecting a mixture of the first material and second material from an outlet to the mill. The second material comprises at most about 5 percent of a total weight of the first and second materials.

In a 28th embodiment, the method of embodiment 27, where the second material comprises a binding agent, a water treatment agent, a purifying agent, or a nutritional additive.

In a 29th embodiment, the method of embodiment 28, further comprising passing the mixture of the first material and second material through a compressing machine.

In a 30th embodiment, the method of embodiment 29, wherein the compressing machine forms the mixture into pellets.

In a 31st embodiment, a fill material made from palm fronds comprising a processed palm frond component, and an additive. The palm frond component and the additive have a ratio by weight between 85:1 and 99:1.

In a 32nd embodiment, the fill material of embodiment 31, wherein the processed palm frond component has a moisture content between 10 and 14 percent.

In a 33rd embodiment, the fill material of any of embodiments 31-32, wherein the fill material is cut to between 1 and 3 inches.

In a 34th embodiment, the fill material of any of embodiments 31-32, wherein the fill material is cut to between 2 and 8 inches.

In a 35th embodiment, the fill material of any of embodiments 31-32, wherein the fill material is cut to between 6 and 18 inches.

In a 36th embodiment, a method of making a fill material from palm fronds comprising collecting palm fronds; shredding, chopping, or grinding the palm fronds; combining an additive to the palm fronds, wherein the palm component and the additive component have a ratio by weight of between 85:1 and 99:1.

In a 37th embodiment, the method of embodiment 36, wherein the additive comprises a ballast material, a binding agent, a water treatment agent, a purifying agent, or a nutritional additive.

In a 38th embodiment, the method of embodiment 37, wherein collecting palm fronds further comprises collecting palm fronds with a moisture content between about 10 and about 14 percent.

In a 39th embodiment, the method of embodiment 36, further comprising the step of drying the palm fronds to a moisture content between about 10 and about 14 percent.

In a 40th embodiment, the method of embodiment 36, wherein shredding, chopping, or grinding the palm fronds comprises shredding the palm fronds.

In a 41st embodiment, the method of embodiment 40, further comprising the step of chopping the palm fronds after shredding the palm fronds.

In a 42nd embodiment, the method of embodiment 41, further comprising the step of grinding the palm fronds after chopping the palm fronds.

In a 43rd embodiment, a method for water flow control comprising filling a container with processed palm component, transporting the container to a given location, and placing the filled container at the given location.

In a 44th embodiment, the method of embodiment 43, wherein the container comprises a wattle.

In a 45th embodiment, the method of embodiment 43, wherein the container comprises a bag.

In a 46th embodiment, the method of embodiment 43, wherein the container comprises a fabric comprised of palm frond material.

In a 47th embodiment, the method of embodiment 46, wherein the fabric is sewn, thatched, or laced.

In a 48th embodiment, the method of embodiment 44, wherein the wattle comprises a mesh netting.

In a 49th embodiment, a method for producing water flow control structures, the method comprising filling a container with processed palm component.

In a 50th embodiment, the method of embodiment 49, wherein the container comprises a wattle.

In a 51st embodiment, the method of embodiment 49, wherein the container comprises a bag.

In a 52nd embodiment, the method of embodiment 49, wherein the container comprises a fabric comprised of palm frond material, a geotextile, a plastic, a nylon, or a biodegradable material.

In a 53rd embodiment, the method of embodiment 52, wherein the fabric is sewn, thatched, or laced.

In a 54th embodiment, the method of embodiment 50, wherein the wattle comprises a mesh netting.

In a 55th embodiment, a structure for controlling erosion or water flow comprising a container, wherein the container is filled with a processed palm frond material.

In a 56th embodiment, the structure of embodiment 39, wherein the container comprises a wattle.

In a 57th embodiment, the structure of embodiment 55, wherein the container comprises a bag.

In a 58th embodiment, the structure of embodiment 55, wherein the container comprises a fabric comprised of palm frond material, a geotextile, a plastic, a nylon, or a biodegradable material.

In a 59th embodiment, the structure of embodiment 58, wherein the fabric is sewn, thatched, or laced.

In a 60th embodiment, the structure of embodiment 56, wherein the wattle comprises a mesh netting.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A bio-friendly water flow control system, the system comprising:
    a portable structure adapted to contain organic waste material and configured for deployment outdoors to guide water flow to limit erosion, the portable structure comprising:
        a sheath configured to contain waste material within an interior of the sheath and to allow a flow of water into the interior of the sheath;
        a first waste material comprising processed palm frond particles, each of the processed palm frond particles having a length of less than three inches, wherein the processed palm frond particles are disposed in the interior of the sheath and configured to absorb a weight of water at least 50% greater than a dry weight of the portable structure; and
        an absorptive core comprising:
            a jacket configured to allow the flow of water therethrough, the jacket comprising a jacket interior; and
            a second waste material different from the first waste material disposed in the interior of the jacket;
        wherein the portable structure has an outer surface and a major axis in an elongate fill configuration, the outer surface disposed circumferentially around the major axis of the portable structure, wherein the absorptive core is generally coaxial with the major axis of the portable structure, and wherein the portable structure is configured to direct a course of water flow along the outer surface of the portable structure.

2. The system of claim 1, wherein in the elongate fill configuration the portable structure has a length along the major axis of between about 25 feet and 30 feet.

3. The system of claim 1, wherein in the elongate fill configuration the portable structure has a diameter of between about six inches and fifteen inches orthogonal to the major axis.

4. The system of claim 1, wherein the dry weight of the portable structure is a weight of the portable structure where the first waste material has a moisture content of less than 15% by weight.

5. The system of claim 1, wherein the dry weight of the portable structure is less than about 120 pounds.

6. The system of claim 1, wherein in a planar fill configuration the portable structure has a footprint of between about 40 square inches and 3200 square inches.

7. The system of claim 1, wherein in a planar fill configuration the portable structure has a height of between about 3 inches and 12 inches.

8. The system of claim 1, wherein in a planar fill configuration the portable structure has a dry weight of between about one and nine pounds.

9. The system of claim 1, wherein the sheath comprises a biodegradable material.

10. The system of claim 1, wherein the sheath comprises a mesh structure.

11. The system of claim 1, wherein the first waste material is shaped to pass through a grinding screen having holes with a diameter of about two inches.

12. The system of claim 1, wherein the first waste material is shaped to pass through a grinding screen having holes with a diameter of about a half inch.

13. The system of claim 1, wherein the sheath comprises a mesh structure.

14. The system of claim 1, wherein the second waste material comprises processed palm frond particles having a diameter of less than 1 inch, wherein the second waste material is disposed in the interior of the sheath and configured to absorb a weight of water at least 100% greater than a dry weight of the second waste material, wherein the dry weight of second waste material is a weight where the second waste material has a moisture content of less than 15% by weight.

15. A method of guiding an otherwise natural flow of water in part using organic waste material, the method comprising:
    arranging for waste material comprising palm fronds to dry until the palm fronds reach a moisture content below a first moisture threshold;
    using a grinder, grinding the waste material into first processed palm frond particles having a diameter of less than three inches and second processed palm frond particles having a maximum diameter different from the first processed palm frond particles;
    forming a portable structure by filling an interior of a sheath with the ground waste material of the first processed palm frond particles to a density of waste material configured to allow a minimum absorption of water by the ground waste material, the minimum absorption of water characterized as a weight of water greater than 50% of a dry weight of the ground waste material of the first processed palm frond particles;

forming an absorptive core within the portable structure, the absorptive core having a jacket configured to allow the flow of water therethrough, the jacket comprising a jacket interior, wherein the ground waste material of the second processed palm frond particles is disposed in the interior of the jacket,; and providing the portable structure for delivery to a location for use in guiding water flow.

16. The method of claim 15, further comprising the step of grinding at least a portion of the waste material into processed palm frond particles having a diameter of less than a half inch.

17. The method of claim 15, wherein the step of forming a portable structure comprises filling the interior of the sheath in an elongate fill configuration, wherein the portable structure defines a major axis of the portable structure, wherein a length of the portable structure along the major axis is at least five times a diameter of the portable structure perpendicular to the major axis.

18. The method of claim 15, wherein the step of forming a portable structure comprises filling the interior of the sheath in a planar fill configuration, wherein the portable structure has a length of between about 7 inches and 50 inches and a width of between about 5 inches and 40 inches.

19. The method of claim 15, wherein the portable structure is configured to absorb a weight in water of at least 100% greater than a dry weight of the portable structure.

20. The method of claim 15, wherein the ground waste material of the second processed palm frond particles has a density configured to allow a minimum absorption of water by the ground waste material, the minimum absorption of water characterized as a weight of water greater than 100% of a dry weight of the ground waste material of the second processed palm frond particles, wherein the dry weight of the second palm frond particles is a weight where the second palm frond particles have a moisture content of less than 15% by weight of the second processed palm frond particles.

* * * * *